United States Patent
Xu

(10) Patent No.: US 10,928,683 B2
(45) Date of Patent: Feb. 23, 2021

(54) GAMMA AUTOMATIC ADJUSTING METHOD AND GAMMA AUTOMATIC ADJUSTING METHOD SYSTEM

(71) Applicant: Shenzhen China Star Optoelectronics Semiconductor Display Technology Co., Ltd., Guangdong (CN)

(72) Inventor: Zhengxing Xu, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 435 days.

(21) Appl. No.: 15/775,933

(22) PCT Filed: Mar. 12, 2018

(86) PCT No.: PCT/CN2018/078692
§ 371 (c)(1),
(2) Date: May 14, 2018

(87) PCT Pub. No.: WO2019/153410
PCT Pub. Date: Aug. 15, 2019

(65) Prior Publication Data
US 2020/0301212 A1    Sep. 24, 2020

(30) Foreign Application Priority Data
Feb. 9, 2018 (CN) .......................... 201810136133.X

(51) Int. Cl.
G02F 1/1337 (2006.01)
G02F 1/13 (2006.01)
G09G 3/20 (2006.01)

(52) U.S. Cl.
CPC ...... *G02F 1/133788* (2013.01); *G02F 1/1309* (2013.01); *G09G 3/20* (2013.01); *G09G 2320/0673* (2013.01)

(58) Field of Classification Search
CPC ... G02F 1/133788; G02F 1/1309; G09G 3/20; G09G 2320/0673
See application file for complete search history.

(56) References Cited

U.S. PATENT DOCUMENTS

| | | | |
|---|---|---|---|
| 2005/0105028 A1* | 5/2005 | Tung | G02F 1/133514 349/124 |
| 2006/0279502 A1* | 12/2006 | Chang | G09G 3/36 345/95 |
| 2016/0116767 A1* | 4/2016 | Xu | G02F 1/1303 445/3 |
| 2016/0306472 A1* | 10/2016 | Park | H01L 27/323 |
| 2017/0199434 A1* | 7/2017 | Hosaka | C08G 73/10 |
| 2019/0333203 A1* | 10/2019 | Li | G02F 1/1309 |

* cited by examiner

*Primary Examiner* — Ariel A Balaoing

(57) ABSTRACT

A gamma automatic adjusting method and a gamma automatic adjusting system are provided. The method includes steps as follows: acquiring parameters of main affecting factors a gamma value in a liquid crystal panel light alignment; using a gamma model upon detecting a varied parameter of the main affecting factor; calculating and outputting an adjusting parameter of the main affecting factor by the gamma model to a UV irradiating machine; and irradiating the liquid crystal panel by the UV irradiating machine according to the adjusting parameter to keep the gamma value within a predetermined range.

8 Claims, 3 Drawing Sheets

GAMMA AUTOMATIC ADJUSTING METHOD AND GAMMA AUTOMATIC ADJUSTING METHOD SYSTEM

FIELD OF INVENTION

The present invention relates to thin-film transistor (TFT) liquid crystal display (LCD) display panel manufacturing fields, especially to a gamma automatic adjusting method and a gamma automatic adjusting system.

BACKGROUND OF INVENTION

In manufacturing processes of thin-film transistor (TFT) liquid crystal displays (LCDs), more and more new generations of production line (8th generation and newer) employs liquid crystal light alignment technology as a replacement for a conventional method of aligning a polyimide (PI) film by friction. The liquid crystal light alignment technology refers to, under application of a voltage to a substrate, monomer reaction in the panel is promoted by irradiation of ultraviolet (UV) such that liquid crystal alignment is achieved. During the light alignment, parameters such as intensity and time of irradiation of UV light can be controlled to optimize the quality of products, especially such control of parameters has greater influence to optical characteristics of products of TFT LCDs.

Gamma characteristic, among optical characteristics of the products, is very important. The gamma is entire description to the brightness vault of each grayscale of the TFT LCD panel and is proportional to the brightness through the panel. When the gamma value is 2.2, the panel presents the optimized visual effect to human eyes. It is known that brightness through the panel is related to TFT LCD manufacturing process stations and process parameters. However, the process parameters of such stations frequently vary (process variation) and therefore result in influence to the brightness through the panel, which causes poor gamma value and negatively affects visual effect of the panel.

Therefore, it is necessary to provide a method for maintaining the optimized gamma value to solve the existent issue of the prior art.

SUMMARY OF THE INVENTION

The present invention provides a gamma automatic adjusting method and system that can keep a best gamma value to improve the optical characteristics of the products.

To solve the above issue, the present invention provides a technical solution as follows:

The present invention provides a gamma automatic adjusting method, comprising:

step S1, in a liquid crystal panel light alignment process, acquiring parameters of main affecting factors of each process station that affect a gamma value, wherein the gamma value is within a predetermined range;

step S2, using a gamma model upon detecting a varied parameter of the main affecting factors;

step S3, calculating, according to the varied parameter of the main affecting factor, an adjusting parameter of the main affecting factor by the gamma model, and outputting the adjusting parameter to an ultraviolet (UV) irradiating machine;

step S4, according to the adjusting parameter, irradiating the liquid crystal panel by the UV irradiating machine to keep the gamma value within the predetermined range such that monomers of a liquid crystal layer in the liquid crystal panel are formed over an alignment layer/alignment member corresponding to the adjusting parameter.

According to a preferred embodiment of the present invention, before the step S1, the method further comprises:

step S101, acquiring affecting factors of each process station of the liquid crystal panel light alignment process that affect the gamma value;

step S102, determining a correlation between the affecting factors and the gamma value;

step S103, acquiring the main affecting factors having a strong correlation with the gamma value, and deriving a relationship equation associated the gamma value and the main affecting factors to; and step S104, modeling the gamma model according based on the relationship equation.

According to a preferred embodiment of the present invention, the affecting factors comprise transparent electrode threshold dimension, polyimide thin film thickness, polyimide thin film baking-curing temperature, adhesive frame curing oven temperature, liquid crystal material, and accumulated UV irradiating light amount.

According to a preferred embodiment of the present invention, the main affecting factors comprise the transparent electrode threshold dimension and the accumulated UV irradiating light amount.

According to a preferred embodiment of the present invention, the relationship equation associated with the gamma value and the main affecting factor is as follows:

$$\text{gamma} = a * \text{transparent electrode threshold dimension} + b * \text{accumulated UV irradiating light amount} + c$$

where a is a related coefficient of the transparent electrode threshold dimension, b is a related coefficient of the accumulated UV irradiating light amount, and c is a constant.

According to a preferred embodiment of the present invention, the step S3 comprises: according to the varied parameter of the transparent electrode threshold dimension, calculating an adjusting parameter corresponding to the accumulated UV irradiating light amount by the gamma model, and outputting the adjusting parameter to the UV irradiating machine.

According to a preferred embodiment of the present invention, the step S4 comprises: according to the adjusting parameter, adjusting intensity or time of irradiation of the UV irradiating machine to the liquid crystal panel such that the gamma value is kept within the predetermined range.

According to a preferred embodiment of the present invention, a maximum redundancy amount of the accumulated UV irradiating light amount of the UV irradiating machine is verified, and the accumulated UV irradiating light amount corresponding to the adjusting parameter is less than or equal to the maximum redundancy amount.

The present invention also provides a gamma automatic adjusting system including:

a detecting unit configured to detect parameters of main affecting factors of each process station that affect a gamma value in a liquid crystal panel light alignment process;

a gamma model unit, upon detecting a varied parameter of the main affecting factors, configured to calculate an adjusting parameter of the main affecting factor corresponding to the gamma value in a predetermined range and configured to output the adjusting parameter to a UV irradiating machine; and an adjusting unit, according to the adjusting parameter of the gamma model unit, configured to adjust parameters of the UV irradiating machine to irradiate the liquid crystal panel to keep the gamma value within the predetermined range such that monomers of a liquid crystal layer in the liquid crystal panel are formed over an alignment layer/alignment member corresponding to the adjusting parameter;

wherein a correlation of the gamma value and the main affecting factors is a strong correlation, and the main affecting factors comprise a transparent electrode threshold dimension and a accumulated UV irradiating light amount;

wherein when the detecting unit detects a varied parameter of the transparent electrode threshold dimension, the gamma model unit is configured to calculate the adjusting parameter of the accumulated UV irradiating light amount;

wherein the adjusting unit, according to the adjusting parameter, is configured to adjust intensity or time of irradiation of the UV irradiating machine to the liquid crystal panel.

The present invention also provides a gamma automatic adjusting system including:

a detecting unit, in a liquid crystal panel light alignment process, configured to detect parameters of main affecting factors of each process station that affect a gamma value;

a gamma model unit, upon detecting a varied parameter of the main affecting factors, configured to calculate an adjusting parameter of the main affecting factor corresponding to the gamma value in a predetermined range and configured to output the adjusting parameter to a UV irradiating machine; and an adjusting unit, according to the adjusting parameter of the gamma model unit, configured to adjust parameters of the UV irradiating machine to irradiate the liquid crystal panel to keep the gamma value within the predetermined range such that monomers of a liquid crystal layer in the liquid crystal panel are formed over an alignment layer/alignment member corresponding to the adjusting parameter.

Advantages of the present invention are as follows. In comparison to the poor gamma value existing in the conventional light alignment technology, a gamma automatic adjusting method and system provided by the present invention model a model by finding key parameters affecting the gamma value during the liquid crystal panel light alignment process. When a related parameter is varied, the varied data is transferred to an ultraviolet (UV) irradiation machine, and the UV irradiating machine automatically selects the parameter to match the varied parameter of the previous process such that an optimized gamma value is achieved. The issue that the process parameters of such stations frequently vary (process variation) and therefore result in influence to the brightness through the panel, which causes poor gamma value is avoided. The present invention can keep the best gamma value such that improve the optical characteristics of the liquid crystal panel and simultaneously while avoiding loss of module productivity due to adjustment of the gamma value in the module process section.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

The technical solution in the embodiment of the present invention will be clearly and completely described below with reference to the accompanying drawings in the embodiments of the present invention. Apparently, the described embodiments are merely some embodiments of the present invention instead of all embodiments. According to the embodiments in the present invention, all other embodiments obtained by those skilled in the art without making any creative effort shall fall within the protection scope of the present invention.

The present invention aims at the technical issue that in a light alignment technology, process parameters of different stations frequently vary (process variation) and therefore result in influence to the brightness through the panel, which causes poor gamma value and negatively affects the visual effect of the panel. The present invention can solve the above issue.

The present invention, by six sigma management method, finds key parameters affecting a gamma value and models a model. When a related parameter is varied, the varied data is transferred to an ultraviolet (UV) irradiation machine, and the UV irradiating machine automatically selects the parameter to match the varied parameter of the previous process such that an optimized gamma value is achieved.

Figure 1:
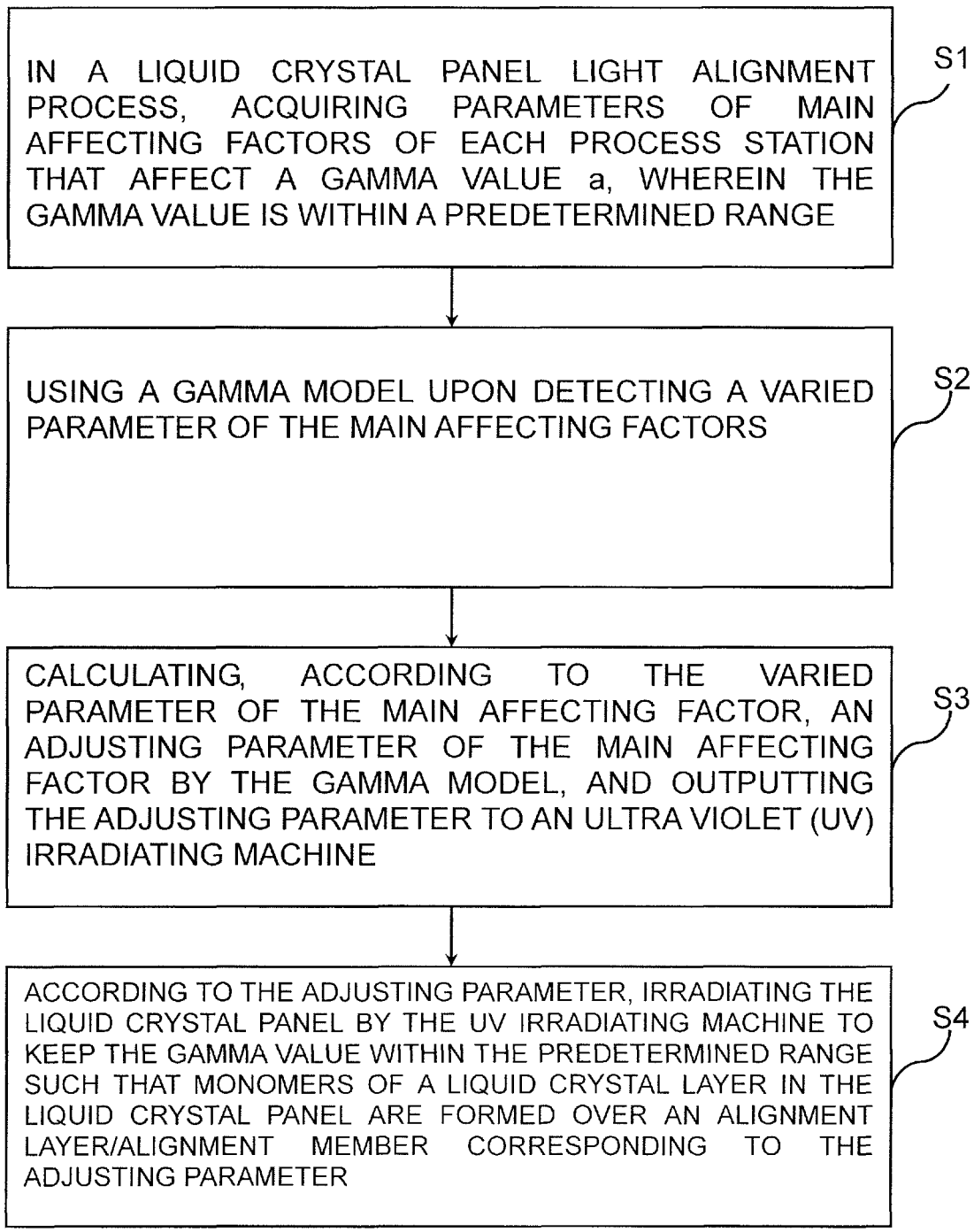
FIG. 1 is a flowchart of a gamma automatic adjusting method provided by the present invention.

With reference to FIG. 1 that is a flowchart of a gamma automatic adjusting method provided by the present invention, the method steps as follows:

step S1, in a liquid crystal panel light alignment process, acquiring parameters of main affecting factors of each process station that affect a gamma value, wherein the gamma value is within a predetermined range;

step S2, using a gamma model upon detecting a varied parameter of the main affecting factors;

step S3, calculating, according to the varied parameter of the main affecting factor, an adjusting parameter of the main affecting factor by the gamma model, and outputting the adjusting parameter to an ultraviolet (UV) irradiating machine;

step S4, according to the adjusting parameter, irradiating the liquid crystal panel by the UV irradiating machine to keep the gamma value within the predetermined range such that monomers of a liquid crystal layer in the liquid crystal panel are formed over an alignment layer/alignment member corresponding to the adjusting parameter.

Figure 2:
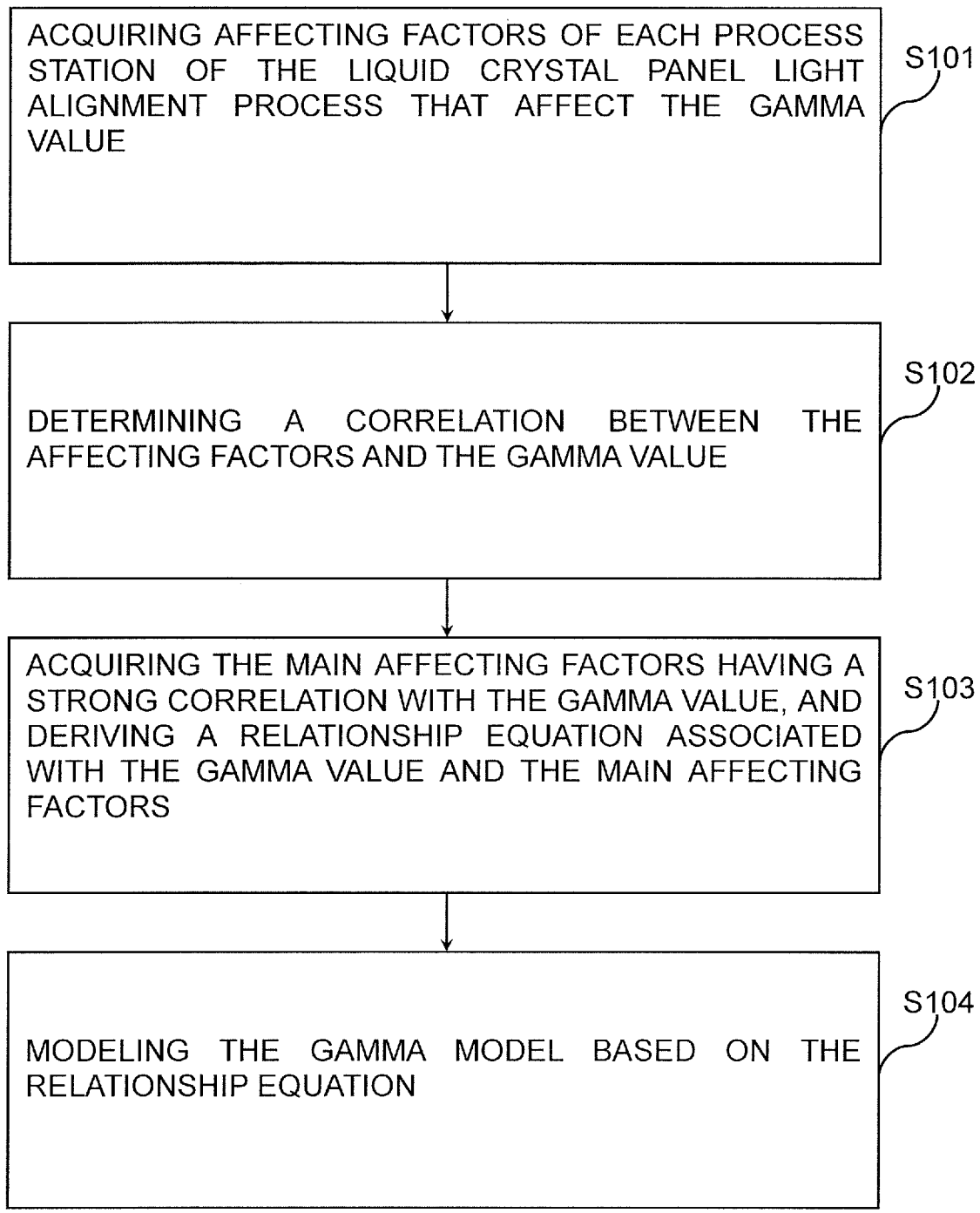
FIG. 2 is a flowchart of a method for modeling a gamma model provided by the present invention.

Before the step S1, the method further includes preparation works for modeling the gamma model. With reference to FIG. 2, the method further includes:

step S101, acquiring affecting factors of each process station of the liquid crystal panel light alignment process that affect the gamma value;

step S102, determining a correlation between the affecting factors and the gamma value;

step S103, acquiring the main affecting factors having a strong correlation with the gamma value, and deriving a relationship equation associated with the gamma value and the main affecting factors; and step S104, modeling the gamma model according based on the relationship equation.

Specifically, first according to historical data and expert experience, the affecting factors of each process station of the light alignment process of the liquid crystal panel that affect the gamma value are acquired. For example, the affecting factors can include a transparent electrode threshold dimension (ITO CD), a polyimide thin film (PI film) thickness, a polyimide thin film baking-curing temperature, a frame adhesive curing oven temperature, a liquid crystal material, and a accumulated UV irradiating light amount, etc. Second, a software of MINITAB (the software tool of quality management and six sigma implementation) is used to determine and find a correlation of the affecting factors and the gamma value. It is found that the transparent electrode threshold dimension and the accumulated UV irradiating light amount are the main affecting factors having a strong correlation with the gamma value. Other affecting factors affect the gamma value, but only significantly affect the gamma value when adjusted greatly. For example, the polyimide thin film baking-curing temperature needs to vary for 10° C. to have the gamma value with variation being >0.1. In the actual production, variation range of the polyimide thin film baking-curing temperature is <3° C., which barely affects the gamma value.

According to the experiment data, the gamma value, the transparent electrode threshold dimension and the accumulated UV irradiating light amount are associated with a relationship equation. The relationship equation is described as follows:

$$gamma = a * \text{transparent electrode threshold dimension} + b * \text{accumulated UV irradiating light amount} + c;$$

where a is a related coefficient of the transparent electrode threshold dimension, b is a related coefficient of the accumulated UV irradiating light amount, and c is a constant. The credibility of the relationship equation is verified. According to the deriving determination, the relationship equation R being >90% indicates that the relationship is more trustworthy. When the gamma value is assured to be 2.2 (When the gamma value is 2.2, the panel presents the optimized visual effect to human eyes.) and the transparent electrode threshold dimension is known according to measurement result of the product line, the needed accumulated UV irradiating light amount can be calculated out based on the above relationship equation.

The gamma model is modeled according to the above relationship equation. During the liquid crystal panel light alignment, the parameters of the main affecting factors of each process station that affect the gamma value are detected. The gamma model is used to automatically adjust the gamma value up detecting a varied parameter of the main affecting factor.

For example, when a measuring instrument for measuring the transparent electrode threshold dimension uploads the parameter of the measured transparent electrode threshold dimension to the gamma model, the gamma model calculates out the gamma value according to the above relationship equation. To make the gamma value within the predetermined range, the adjusting parameter corresponding to the accumulated UV irradiating light amount would be a certain value, the adjusting parameter is outputted to the UV irradiating machine, and is fed back to a HVA process. The UV irradiating machine adjusts intensity or time of irradiation to the liquid crystal panel according to the adjusting parameter to keep the gamma value within the predetermined range such that monomers of a liquid crystal layer in the liquid crystal panel are formed over an alignment layer/alignment member corresponding to the adjusting parameter. The predetermined range of the gamma value is from 2.0 to 2.4. Preferably, the predetermined range is from 2.1 to 2.3. Preferably, the gamma value is 2.2. However, to keep stability of irradiation intensity on the liquid crystal panel, usually only the irradiation time is adjusted. At the same time, an adjustable maximum redundancy amount of the accumulated UV irradiating light amount of the UV irradiating machine needs to be verified to avoid misalignment of the liquid crystal panel or derivative issues due to adjustment of the accumulated UV irradiating light amount. Furthermore, the accumulated UV irradiating light amount corresponding to the adjusting parameter should be less than or equal to the maximum redundancy amount.

By the above steps, the correlation of the transparent electrode threshold dimension, the accumulated UV irradiating light amount and the gamma value is modeled. Therefore, the production line can dynamically adjust the parameters to avoid the gamma value of the liquid crystal panel from exceeding the standard due to variation of the transparent electrode threshold dimension.

The above method is not limited to adjustment of the transparent electrode threshold dimension to the influence of the gamma value. For example, if the verification result shows that fluctuation of the PI film thickness has significant influence to the gamma value, the only thing needs to be done is re-calculating the above relationship equation to add the influence of the PI film thickness into the relationship equation to be associated with. At the same time the above gamma model acquires the PI film thickness value in real time, performs calculation, and feeds back the UV irradiating machine to implement parameter adjustment. No more details are given here.

Figure 3:
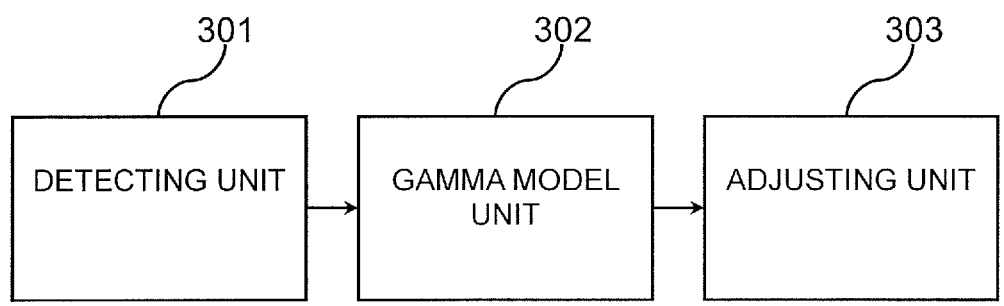
FIG. 3 is a schematic view of a gamma automatic adjusting system provided by the present invention.

The present invention also provides a gamma automatic adjusting system. With reference to FIG. 3, the system includes: a detecting unit 301, a gamma model unit 302, and an adjusting unit 303. Before a light alignment process of the liquid crystal panel, a gamma model can be modeled in the gamma model unit 302 first, modeling of the gamma model is the same as that in the method. No more details are given here.

The detecting unit 301 is configured to detect parameters of the main affecting factors of each process station of the light alignment process of the liquid crystal panel that affect the gamma value.

The affecting factors that affect the gamma value are a transparent electrode threshold dimension, a PI film thickness, a PI film baking-curing temperature, a frame adhesive curing oven temperature, a liquid crystal material, and a accumulated UV irradiating light amount, etc. According to detection and determination, the main affecting factors include the transparent electrode threshold dimension and the accumulated UV irradiating light amount; The correlation of the gamma value and the main affecting factor is a strong correlation.

The gamma model unit 302, when the detecting unit 301 detects a varied parameter of the main affecting factors, is configured to calculate an adjusting parameter of the main affecting factor corresponding to the gamma value in a predetermined range and configured to output the adjusting parameter to a UV irradiating machine.

When the detecting unit 301 detects a varied parameter of the transparent electrode threshold dimension, the gamma model unit 302 is configured to calculate the adjusting parameter of the accumulated UV irradiating light amount.

The predetermined range of the gamma value is from 2.0 to 2.4. Preferably, the predetermined range is from 2.1 to 2.3. Preferably, the gamma value is 2.2.

The adjusting unit 303, according to the adjusting parameter of the gamma model unit 302, is configured to adjust intensity or time of irradiation of the UV irradiating machine to the liquid crystal panel such that the gamma value is kept within the predetermined range.

The adjusting unit 303, according to the adjusting parameter, is configured to adjust intensity or time of irradiation of the UV irradiating machine to the liquid crystal panel. Preferably, only adjustment of irradiation time is required to form monomers of the liquid crystal layer in the liquid crystal panel over the alignment layer/alignment member corresponding to the adjusting parameter.

In comparison to the poor gamma value existing in the conventional light alignment technology, a gamma automatic adjusting method and system provided by the present invention model a model by finding key parameters affecting the gamma value during the liquid crystal panel light alignment process. When a related parameter is varied, the varied data is transferred to an ultraviolet (UV) irradiation machine, and the UV irradiating machine automatically selects the parameter to match the varied parameter of the previous process such that an optimized gamma value is achieved. The issue that the process parameters of such stations frequently vary (process variation) and therefore result in influence to the brightness through the panel, which causes poor gamma value is avoided. The present invention can keep the best gamma value such that improve the optical characteristics of the liquid crystal panel and simultaneously while avoiding loss of module productivity due to adjustment of the gamma value in the module process section.

Although the preferred embodiments of the present invention have been disclosed as above, the aforementioned preferred embodiments are not used to limit the present invention. The person of ordinary skill in the art may make various of changes and modifications without departing from the spirit and scope of the present invention. Therefore, the scope of protection of the present invention is defined by the scope of the claims.

What is claimed is:

1. A gamma automatic adjusting method, comprising:
   step S1, in a liquid crystal panel light alignment process, acquiring parameters of main affecting factors of each process station that affect a gamma value, wherein the gamma value is within a predetermined range;
   step S2, using a gamma model upon detecting a varied parameter of the main affecting factors;
   step S3, calculating, according to the varied parameter of the main affecting factor, an adjusting parameter of the main affecting factor by the gamma model, and outputting the adjusting parameter to an ultraviolet (UV) irradiating machine;
   step S4, according to the adjusting parameter, irradiating the liquid crystal panel by the UV irradiating machine to keep the gamma value within the predetermined range such that monomers of a liquid crystal layer in the liquid crystal panel are formed over an alignment layer/alignment member corresponding to the adjusting parameter;
   wherein before the step S1, the method further comprises:
      step S101, acquiring affecting factors of each process station of the liquid crystal panel light alignment process that affect the gamma value;
      step S102, determining a correlation between the affecting factors and the gamma value;
      step S103, acquiring the main affecting factors having a strong correlation with the gamma value, and deriving a relationship equation associated with the gamma value and the main affecting factors; and
      step S104, modeling the gamma model based on the relationship equation.

2. The method as claimed in claim 1, wherein the affecting factors comprise a transparent electrode threshold dimension, a polyimide thin film thickness, a polyimide thin film baking-curing temperature, an adhesive frame curing oven temperature, a liquid crystal material, and an accumulated UV irradiating light amount.

3. The method as claimed in claim 2, wherein the main affecting factors comprise the transparent electrode threshold dimension and the accumulated UV irradiating light amount.

4. The method as claimed in claim 1, wherein the relationship equation associated with the gamma value and the main affecting factor is as follows:

$$\text{gamma} = a * \text{transparent electrode threshold dimension} + b * \text{accumulated UV irradiating light amount} + c;$$

where a is a related coefficient of the transparent electrode threshold dimension, b is a related coefficient of the accumulated UV irradiating light amount, and c is a constant.

5. The method as claimed in claim 4, wherein the step S3 comprises: according to the varied parameter of the transparent electrode threshold dimension, calculating an adjusting parameter corresponding to the accumulated UV irradiating light amount by the gamma model, and outputting the adjusting parameter to the UV irradiating machine.

6. The method as claimed in claim 5, wherein the step S4 comprises: according to the adjusting parameter, adjusting intensity or time of irradiation of the UV irradiating machine to the liquid crystal panel such that the gamma value is kept within the predetermined range.

7. The method as claimed in claim 5, wherein a maximum redundancy amount of the accumulated UV irradiating light amount of the UV irradiating machine is verified, and the accumulated UV irradiating light amount corresponding to the adjusting parameter is less than or equal to the maximum redundancy amount.

8. A gamma automatic adjusting method, comprising:
   detecting parameters of main affecting factors of each process station that affect a gamma value in a liquid crystal panel light alignment process;
   upon detecting a varied parameter of the main affecting factors, calculating an adjusting parameter of the main affecting factor corresponding to the gamma value in a predetermined range and configured to output the adjusting parameter to a UV irradiating machine; and
   according to the adjusting parameter, adjusting parameters of the UV irradiating machine to irradiate the liquid crystal panel to keep the gamma value within the predetermined range such that monomers of a liquid crystal layer in the liquid crystal panel are formed over an alignment layer/alignment member corresponding to the adjusting parameter;
   wherein a correlation of the gamma value and the main affecting factors is a strong correlation, and the main affecting factors comprise a transparent electrode threshold dimension and an accumulated UV irradiating light amount;

wherein when a varied parameter of the transparent electrode threshold dimension is detected, the adjusting parameter of the accumulated UV irradiating light amount is calculated;

wherein according to the adjusting parameter, intensity or time of irradiation of the UV irradiating machine to the liquid crystal panel is adjusted.

\* \* \* \* \*